United States Patent [19]

Atesmen et al.

[11] Patent Number: 4,823,216

[45] Date of Patent: Apr. 18, 1989

[54] MICROMINIMONOLITHIC MAGNETIC HEAD SLIDER

[75] Inventors: Mehmet K. Atesmen, Goleta; Warren D. Myers, II, Santa Barbara, both of Calif.

[73] Assignee: Applied Magnetics Corporation, Goleta, Calif.

[21] Appl. No.: 112,895

[22] Filed: Oct. 23, 1987

[51] Int. Cl.$^4$ .............................................. G11B 5/60
[52] U.S. Cl. .................................................. 360/103
[58] Field of Search ...................... 360/102, 103, 97–99

[56] References Cited

U.S. PATENT DOCUMENTS

| 3,823,416 | 7/1974  | Warner      | 360/103 |
| 3,908,194 | 9/1975  | Romankiw    | 360/122 |
| 4,555,739 | 11/1985 | Le Van et al. | 360/103 |
| 4,670,807 | 6/1987  | Gorter et al. | 360/120 |

FOREIGN PATENT DOCUMENTS

| 0146217   | 6/1985  | European Pat. Off. | 360/103 |
| 54-159211 | 12/1979 | Japan              | 360/103 |
| 55-163629 | 12/1980 | Japan              | 360/103 |
| 56-105359 | 8/1981  | Japan              | 360/103 |
| 56-153558 | 11/1981 | Japan              | 360/103 |
| 57-82252  | 5/1982  | Japan              | 360/103 |
| 59-72679  | 4/1984  | Japan              | 360/103 |

OTHER PUBLICATIONS

Nakanishi et al., "Magnetic Recording Head for 800 Mega Byte Disk Drive" Review of the Electrical Communication Laboratories, vol. 28, Nos. 5-6, May-Jun., 1980, pp. 392–404.

Suzuki et al., "High Density Magnetic Recording Heads for Disks," IEEE Transactions on Magnetics, vol. MAG-17, No. 6, Nov. 1981, pp. 2899–2901.

Primary Examiner—John H. Wolff
Assistant Examiner—Matthew J. Bussan

[57] ABSTRACT

A microminimonolithic magnetic head slider adapted for use with a magnetic head flying on an air cushion over a magnetic media for recording and reproducing tracks of information is shown. The slider includes an aerodynamic surface which has a pair of spaced, parallel load rails which are adapted to fly over the moving magnetic media. The load rails have an air bearing surface formed thereon, and each air bearing surface has a width which is greater than a track width of information on the magnetic media. Also, the aerodynamic surface has, located between the pair of spaced, parallel load rails, a wedged-shaped central rail having an apex which defines an air bearing surface having a width which is less than the width of the air bearing surface on the load rails. The slider includes a transverse slot which is spaced from and extends substantially perpendicular to the pair of spaced, parallel load rails and the central rail and a pair of spaced, vertically extending slots. The transverse slot has a magnetic pole piece defined in that portion thereof located contiguous to the wedged-shaped central rail and the air bearing surface in the apex thereof. A "C" shaped core can be operatively attached to the microminimonolithic magnetic head slider to form a magnetic head slider assembly. The microminimonolithic magnetic head slider has a height of approximately 0.034 inches (0.86 mm).

43 Claims, 2 Drawing Sheets

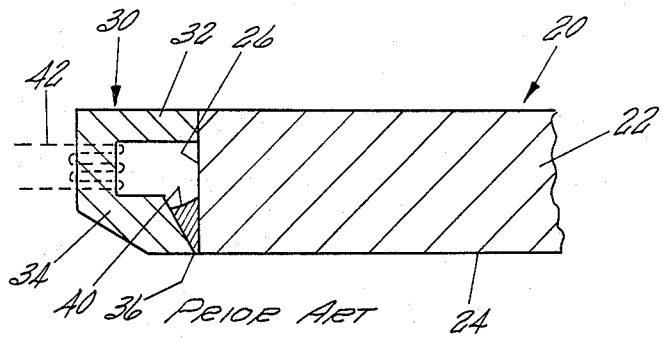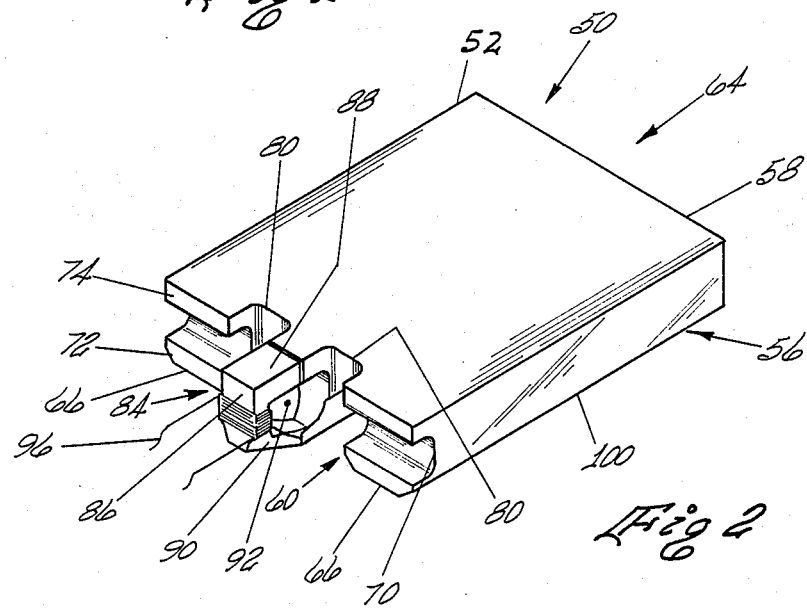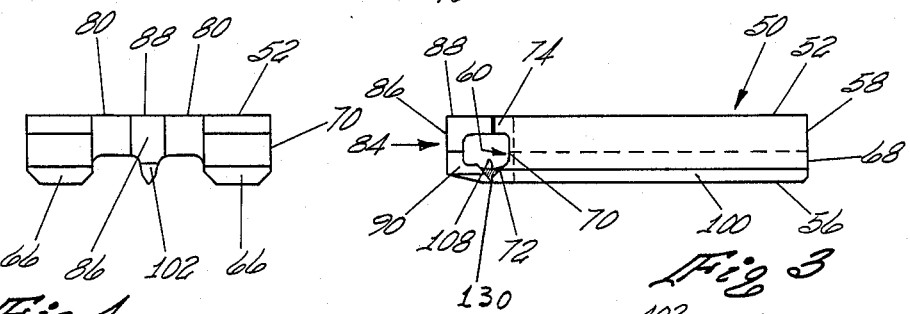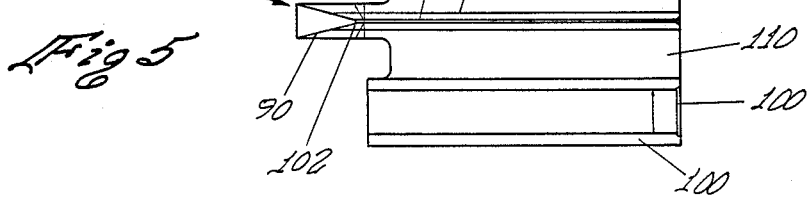

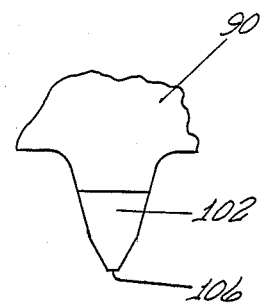
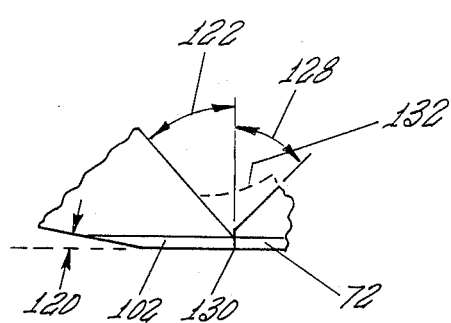
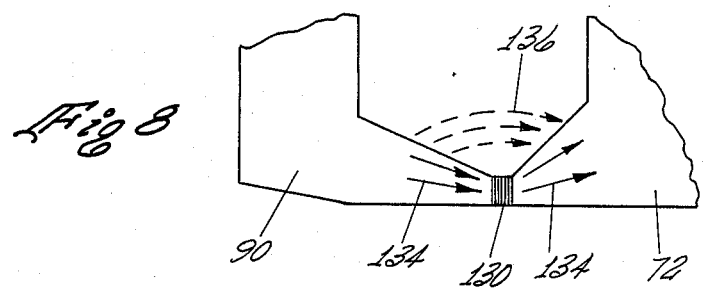
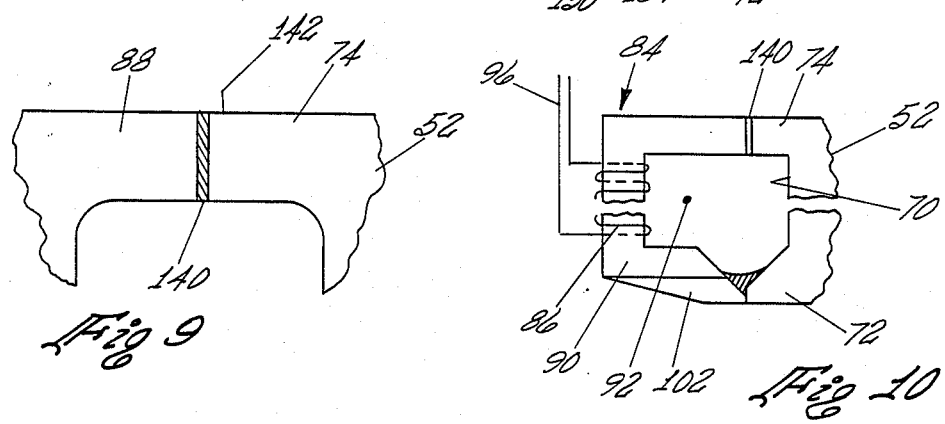
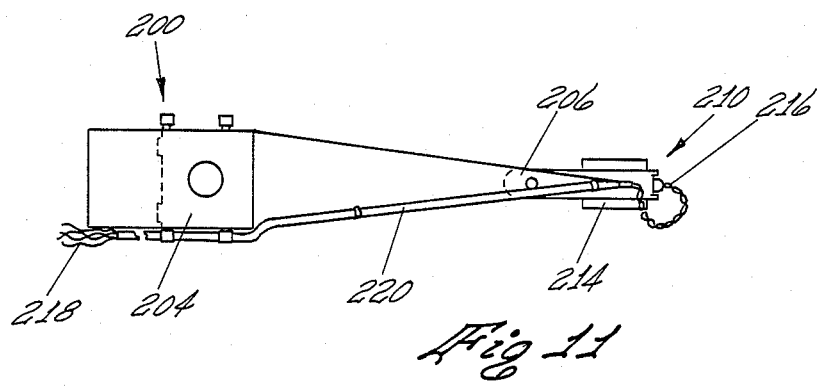

MICROMINIMONOLITHIC MAGNETIC HEAD SLIDER

BACKGROUND OF THE INVENTION

1. Field of the Invention

This invention relates to a magnetic head slider adapted for use with a magnetic head flying on an air cushion over a moving magnetic media for recording and reproducing tracks of information and, more particularly, to a microminimonolithic magnetic head slider having an aerodynamic surface that is adapted to be positioned adjacent to a moving magnetic media during operation and wherein the aerodynamic surface includes a pair of spaced, parallel load rails and a wedged-shaped central rail. A portion of the aerodynamic surface trailing edge is utilized as one pole piece of a magnetic core.

2. Description of the Prior Art

The use of magnetic head slider assemblies is well known in the magnetic recording field. Magnetic head slider assemblies are utilized in hard disk applications, including the well known "Winchester" type rotating disk memory systems. Typically, the magnetic head slider is fabricated to have an aerodynamic surface on the surface thereof which is adapted to interact with a magnetic media moving in a direction towards the slider. One typical magnetic head slider, which is utilized in such applications, is illustrated in FIG. 1 and is labeled "Prior Art". In the prior art magnetic head slider illustrated in FIG. 1, a ceramic-type material is utilized for fabricating a magnetic head slider, show generally as 20, which has a slider body shown generally as 22. The slider body 22 is adapted to interact with the magnetic disk and does so through an aerodynamic surface 24 formed thereon. In the prior art magnetic head sliders, the trailing edge 26 of the slider is in the form of a vertically extending surface which is utilized at one side of a magnetic pole piece. A "C" shaped core material, shown generally as 30 and having an upper end 32 and a lower end 34, is adapted to be operatively attached to the planar surface 26 of the magnetic head slider body 22. The "C" shaped magnetic core 30 has its upper arm 32 positioned to engage the slider body 22 at the upper end thereof to form a magnetic closure path. The other arm 34 is adapted to cooperate with the lower portion of planar surface 26 to form the other side of the magnetic gap. Thus, a magnetic gap 36 is formed between the planar surface 26 of the magnetic slider body 22 as one pole piece and the other pole piece 34 is defined by the "C" shaped magnetic core. The gap 36 is filled with a glass material 40 which provides the bonding of the two elements together to form an integral magnetic head slider assembly.

As is known in the art, a magnetic head slider flexure is used for loading and unloading a magnetic head slider assembly onto a rotating disk memory. One such magnetic head slider flexure is used in the IBM Standard 3370 type suspension assembly.

In the typical prior art rotating disk memories, the spacing between coaxial, aligned rotating disks are typically in the order of 0.250 inches (6.35 mm). In applications having limited disk spacing, the vertical height of the magnetic head slider may provide a limitation in the ability to reduce the spacing between the coaxial aligned rotating disks. The typical height of a magnetic head slider body of the prior art is in the order of 0.050 inches (1.27 mm).

In addition, in the known prior art magnetic head slider assemblies the vertical trailing edge 26 is utilized as one of the two pole pieces for defining the magnetic gap 36. The linkage from the pole piece 34 couples around the gap from the pole piece 34 to the trailing edge 36, thereby bypassing the gap 36. This is referred to in the art as leakage flux. Thus a certain portion of the magnetic flux is lost due to the physical proximity between the magnetic pole piece 34, defining one side of the gap 36, and the trailing edge 26 of the magnetic head slider body 22, which defines the other side of the gap 36.

SUMMARY OF THE PRESENT INVENTION

This invention relates to a new and novel magnetic head slider which is smaller in physical size and structure than the prior art devices and which is capable of being used with a reduced size "C" shaped magnetic core to provide a smaller magnetic head slider assembly and a magnetic transducer which has reduced leakage flux between the pole piece of the "C" shaped core and the trailing edge of the magnetic head slider used as a magnetic pole piece. Thus, the novel magnetic head slider, and a magnetic head slider assembly fabricated using the same, is capable of being used in rotating disk assemblies which include coaxially aligned rotating disks having less distance or spacing between the surfaces of adjacent disks compared to the disk-to-disk distances spacing associated with the prior art devices. Thus, the physical size and structure of the magnetic head slider of the present invention, and a magnetic head slider assembly fabricated therefrom, using the teachings of the present invention, are reduced in size and weight as compared to the physical size, structure and weight of the prior art devices.

The microminimonolithic magnetic head slider of the present invention is adapted for use with a magnetic head flying on an air cushion of a moving magnetic media for recording and reproducing tracks of information. The magnetic head slider has an aerodynamic surface that is adapted to be positioned adjacent to the moving magnetic media during operation. The magnetic head slider includes a leading edge located forward of the aerodynamic surface which is adapted to interact with a magnetic media moving in a direction towards the magnetic head slider. The slider also includes a trailing edge located rearward of the aerodynamic surface. The slider includes means for defining on an aerodynamic surface a pair of spaced, parallel load rails which are adapted to fly over the moving magnetic media. The load rails defining means includes means for defining an air bearing surface formed thereon having a width which is greater than the track width of information on a magnetic media. Each of the load rails terminates at the one end thereof in a leading edge ramp and at the other end of in a trailing edge ramp. The slider further includes means for defining on the aerodynamic surface and between the pair of spaced, parallel load rails, a wedge-shaped central rail having an apex which defines a air bearing surface having a width which is less than the width of the air bearing surface of the load rails. The slider further includes means for defining, through the trailing edge of the slider and through the trailing edge ramp, a transverse slot which is spaced from and extends substantially perpendicular to the pair of spaced, parallel load rails and the central rail. The transverse slot includes means for defining a magnetic pole piece contiguous the wedged-shaped central rail and the air bearing surface formed in the apex thereof. A pair of vertically extending slots are formed in the trailing edge of the slider, one each being located on each side of the central rail such that the central rail extends therebetween.

One disadvantage of the magnetic head slider and magnetic head slider assemblies of the prior art is that the physical size and structure thereof do not permit the magnetic head slider assembly to be inserted into and removed from advanced-of-the-art rotating memory storage devices having closer spacing and distances between adjacent disk surfaces because the head/slider assembly will contact the disk surface, which is highly undesirable.

Another disadvantage of the prior art magnetic head slider is that the height of the magnetic slider combined with the height of the magnetic slider flexure limits the displacement of the head/slider assembly when the same is moved into an "unloaded" position in a rotating disk memory. When the spacing between the surface of adjacent, rotating disk memories is reduced, say to about 0.170 inches (4.31 mm), the magnetic head A slider assembly is restricted from use in such an application due to the thickness of the magnetic head slider body. As such, the magnetic head slider assemblies are unable to move a sufficient distance away from the disk surface. This could result in undesireable contact between the disk surface and the magnetic head slider assembly, particularly when the head/slider assembly is to be moved from the "loaded" position to the "unloaded" position.

Further, the known prior art magnetic head slider assemblies utilize the lower section of a vertically extending trailing edge 26 at one side of a magnetic transducing gap. Such a structure results in a significant amount of flux leakage from the pole piece 34, defined by one end of the "C" shaped magnetic core, and the other pole piece defined by the trailing edge 26. If the distance or height of the magnetic head slider body is decreased and the geometrical dimensions of the "C" shaped magnetic core are likewise decreased, the result would he an increased flux leakage. An increase in flux leakage would reduce the efficiency of operation of the magnetic head slider assembly formed thereby.

The new and novel magnetic head slider, and magnetic head slider assembly formed therefrom, of the present invention overcomes the above disadvantage of the prior art magnetic head slider and magnetic head slider assemblies.

One advantage of the present invention is that the trailing edge of the magnetic head slider is fabricated with a transverse slot to form a definitive magnetic pole piece which is disposed remotely from the magnetic head slider body such that the physical distance between the magnetic pole piece, formed by the end of the transverse slot and the magnetic pole piece on a "C" shaped magnetic core piece are physically increased. When the physical distance is increased between the pole pieces, the amount of leakage flux which extends from the pole piece defined by the lower end of a transverse slot to the magnetic pole piece defined in the "C" shaped magnetic core is decreased.

Another advantage of the present invention is that the magnetic head slider of the present invention can be combined with a reduced size "C" shaped magnetic core wherein the upper end of the magnetic core is operatively attached to the upper portion of the transverse slot to form a magnetic closure section while the lower portion of the "C" shaped magnetic core is formed to have sloping walls such that the magnetic flux passing through the pole pieces are concentrated in the magnetic gap.

Another advantage of the present invention is that the overall height of the magnetic head slider body can be reduced to about 0.034 inches (0.86 mm), which allows a lower profile (i.e. z-height), while achieving improved operating efficiencies due to the more efficient core geometry.

Another advantage of the present invention is that the internal core apex angle can be increased to approximately 90° total, with the 90° angle split approximately equally (45°/45°) between the "C" shaped magnetic core and the magnetic head slider body to decrease core apex flux leakage losses and head inductance and Increase core read efficiency and write field strength.

Another advantage of the present invention is that a horizontal or transverse slot is formed in the trailing edge of the magnetic head slider body to establish or provide the 45° body apex angle portion of the total apex angle of 90° thereby increasing core efficiency.

Another advantage of the present invention is that the resulting opening size in the combined "C" shaped magnetic core/transverse slot places a part of the core opening into the slider body to facilitate coil winding.

Another advantage of the present invention is that two vertical slots are formed in the trailing edge of the slider body and adjacent the "C" shaped magnetic core which facilitates coil winding and which reduces the flux leakage losses and parasitic inductance.

Another advantage of the present invention is that the core geometry/coil winding structure having the same number of turns in the coil as that for the prior art magnetic head slider assembly results in a substantially lower inductance and a higher resonant frequency using static electrical testing procedures.

Another advantage of the present invention is that the core geometry/coil winding structure having the same number of turns in the coil as that for prior art magnetic head slider assembly results in an increased output signal, better resolution, and an improvement in phase margin using dynamic electrical testing procedures.

Another advantage of the present invention is that the reduced height of the magnetic head slider body permits the magnetic head slider assembly formed therefrom to have a smaller physical size such that, when the same is operatively attached to the head slider loading end of a magnetic head slider flexure arm, that combination provides a additional spacing advantage in order to accommodate the smaller distances incurred as a result of the minimize package height design in improved state-of-the-art rotating disk memory systems.

Another advantage of the present invention is that the total weight of the improved magnetic head slider assembly is approximately one-third less than that of the prior art assemblies. This results in a lower mass and less inertia enabling a magnetic head flexure/slider assembly using the teachings of the present invention to have faster access time.

BRIEF DESCRIPTION OF THE DRAWING

FIG. 1 is a partial cross-sectional pictorial representation of a prior art magnetic head slider assembly having a planar, vertically extending trailing edge which is adapted to cooperate with a "C" shaped magnetic core to form the core geometry;

FIG. 2 is a top perspective view showing the top, side and rear plan view of a magnetic head slider assembly utilizing the teachings of the present invention;

FIG. 3 is a side elevational plan view of a magnetic head slider assembly having a magnetic head slider body and a "C" shaped magnetic core affixed thereto;

FIG. 4 is a rear elevational view of the magnetic head slider assembly of FIG. 3 showing the location of the "O" shaped magnetic core and the wedged-shaped central rail;

FIG. 5 is a bottom plan view of the magnetic head slider assembly of FIG. 3;

FIG. 6 is a partial pictorial representation of the wedge-shaped central rail which cooperates with the "C" shaped magnetic core to define the magnetic gap;

FIG. 7 is a partial representation showing the construction detail between the lower end or arm of the "C" shaped magnetic core and of the pole piece defined by the transverse slot formed in the trailing edge and trailing ramp edge of the load rails;

FIG. 8 is a pictorial representation showing the increased concentration of the flux passing through the magnetic gap defined by the "C" shaped magnetic core and the magnetic pole piece defined by the transverse slot;

FIG. 9 is a partial pictorial representation showing a bonding of the upper end or arm of a "C" shaped magnetic core to the upper edge of the trailing edge which defines the transverse slot formed in the magnetic head slider body;

FIG. 10 is a partial pictorial representation of the "C" shaped magnetic core operatively attached to the upper and lower edge of the slider body to define a transverse slot in the trailing edge of the slider body and showing the coil windings formed around the "C" shaped magnetic core; and FIG. 11 is a top plan view of a magnetic head slider flexure arm having a magnetic head slider assembly affixed to the loading end thereof utilizing the teachings of the present invention.

DESCRIPTION OF THE PREFERRED EMBODIMENT

FIG. 1 illustrates a prior art device wherein the "C" shaped magnetic core 30 is affixed to a magnetic head slider body 22 having a vertically extending planar trailing edge 26. The structure of the prior art has been discussed hereinbefore and illustrates the teachings of the prior art that the trailing edge 26 is a vertically extending planar surface which is adapted to receive the "C" shaped magnetic core. This structure has undesirable core flux leakage losses and parasitic inductance.

FIG. 2 illustrates a magnetic head slider assembly, shown generally as 50, which is formed of a magnetic head slider 52 having a "C" shaped magnetic core 84 affixed thereto to form the magnetic head slider assembly. The magnetic head slider 52, which may also be referred to as a magnetic head slider body, is generally referred to herein as a microminimonolithic magnetic head slider which is adapted for use with a magnetic head flying on an air cushion over a moving magnetic media for recording and reproducing tracks of information. The magnetic media has a predetermined direction of movement, wherein the magnetic media and direction of movement is shown generally by arrow 64. The magnetic head slider has an aerodynamic surface, shown generally as 56, which is adapted to be positioned adjacent to a moving magnetic media, shown by arrow 64. The aerodynamic surface 56 is adapted, during operation, to be positioned adjacent to moving magnetic media shown by arrow 64. The magnetic head slider 52 includes a leading edge 58 which is located forward of the aerodynamic surface 56.

The portion of the air bearing surface 56 located adjacent to the leading edge ramp 58 is slightly tapered, at the end thereof, about 50 minutes of angle. The tapered edge is not readily perceivable on FIG. 3, but is shown in FIG. 5. This tapered end interacts with the magnetic media upon start up to initiate the "take off" function of the slider from the disc surface enabling the magnetic head slider to commence "flying" on the air bearing layer provided by the rotation of the moving magnetic disc, which air bearing layer is located between the air bearing surface 56 and the magnetic disc.

The leading edge 58 is adapted to interact with the magnetic media 64, moving in a direction towards the slider 52. As the magnetic media shown by arrow 64 moves toward the translatable magnetic head slider assembly 50, the leading edge 58 engages a laminar air flow stream which is produced by the moving magnetic media, which in the preferred embodiment, is a rotating magnetic disk. In addition, the magnetic head slider 52 includes a trailing edge, shown generally as 60, which is located rearward of the aerodynamic surface 56, and rearward of the leading edge 58.

The magnetic head slider 52 includes means for defining, on the aerodynamic surface, a pair of spaced load rails 66 which are adapted to fly over the moving magnetic media 64. The means for defining load rails 66 include means for defining an air bearing surface, shown generally as air bearing 104 in FIG. 5, formed thereon having a width that is greater than the track width of information on magnetic media 64. The load rails 66 terminate at one end thereof in a leading edge ramp 68 and at the other end thereof in a trailing edge ramp which forms part of the trailing edge 60. The magnetic head slider 52 further includes means for defining on the aerodynamic surface 56, and between the pair of spaced, parallel load rails 66 a wedge-shaped central rail 102, having an apex which defines an air bearing surface 106 having a width which is less than the width of the air bearing surface 104 formed on the load rails 66.

The magnetic head slider 52 further includes means for defining through the trailing edge 60 of the magnetic head slider 52, and through the trailing edge ramp of the load rail 66, a transverse slot 70 which is spaced from and extends substantially perpendicular to a pair of spaced, parallel load rails 66 and a central rail 102 The transverse slot 70 is defined by an upper portion 74 and a lower portion 72 and includes means for defining, on the lower portion 72 thereof, a magnetic pole piece contiguous the wedge-shaped central rail 102 and the air bearing surface 106 formed on the apex thereof.

FIG. 2 also shows that "C" shaped magnetic core, element 84, is bonded to the magnetic head slider 52 to form the magnetic head slider assembly. The "C" shaped magnetic core includes an upper end or arm 88 and a lower end or arm 90. The "C" shaped magnetic core includes a central area 92 which is utilized as a coil receiving cavity for coil 96. The upper end 88 of the core 84 forms one side of a planar magnetic closure portion such that when the "C" shaped magnetic core element is bonded to the upper portion 74 of the trailing edge 60, a closed magnetic path is formed between the upper core leg 66 and the trailing edge 60 of the magnetic head slider 52. Thus, the core geometry is defined by both the "C" shaped magnetic core and the transverse slot 70.

The lower portion 72 of the transverse slot has an angle formed therein such that a magnetic pole piece, having a relatively acute angle, is formed in the lower portion 72 of the transverse slot 70.

The lower outer edge 72 which defines the transverse slot 70 is formed into a magnetic pole piece having an acute angle formed therein as will be explained in greater detail in connection with FIGS. 7 and 8.

FIGS. 3, 4 and 5 show, in greater detail the structural portions of the magnetic head slider and of the "C" shaped magnetic core, which when bonded to the magnetic head slider, forms the magnetic slider assembly. In FIGS. 3, 4 and 5, the coil winding is not illustrated as being wound about the "C" shaped magnetic core as this is discussed and illustrated in greater detail in FIG. 10.

The magnetic head slider 52 is illustrated to have a relatively planar leading edge 58 which is adapted to interact with the rotating magnetic media illustrated by arrow 64. In a rotating magnetic media the load rails 66 are located on the edge of the slider 52 and extend in a direction substantially tangent to the tracks of information on the rotating magnetic media. As illustrated in FIG. 3, the "C" shaped magnetic core 84 is operatively coupled to the upper outer edge 74 which defines the transverse slot 70. The magnetic gap 130 is defined by the lower arm 90 of the "C" shaped magnetic core 84 and the other pole piece is defined by the lower outer edge 72 which defines the transverse slot 70 in the trailing edge 60 of the magnetic head slider 52.

The spacing or length of magnetic gap 130 in the preferred embodiment is selected to have a predetermined length, which in the preferred embodiment, is in the order of about 25 microinches (0.63 microns). In the Preferred embodiment, the thickness or length of the magnetic gap is established by sputtered glass material in the gap. A sputtered layer of high saturation flux density metal, such as for example, alphasil or sendust, may be positioned adjacent to the magnetic gap 130 to enhance the magnetic flux gradient to the magnetic rotating disk. The use of sputtering for forming a magnetic gap is known to persons skilled in the art and need not be set forth herein. Typically, the glass material used for the sputtered glass gap has a softening temperature of about 500° C. to about 800° C. with a firing temperature of about 600° C. to about 900° C. Glass gap materials suitable for forming a sputtered glass gap are sold by a number of known glass manufacturers including Dow Corning Glass as gap glass material.

A filler glass bonding material, shown generally as 108, is utilized to bond the lower arm 90 of the "C" magnetic core member 84 to the outer lower edge 72 of the magnetic head slider 52

The glass bonding techniques for using filler glass are known to a person skilled in the art, and need not be set forth herein. Typically, the filler glass has a softening temperature of about 380° C. to about 440° C. and a firing temperature of about 470° C. to about 560° C. Some examples of filler glasses which may be used in practicing this invention are Corning glass type 7570 and Corning low temperature glass type 8463.

In selecting and performing the glass bonding, the glass selected is to have a coefficient of thermal expansion which is substantially equal to that of the material, e.g. ferrite, used for the magnetic head slider 52. Also, the temperature at which the glass flows should be less than the temperature which would cause a change in the magnetic characteristics of the core and slider material used to define the magnetic gap 130.

Alternatively, sputtered glass or an epoxy may be used during fabrication and assembly. All temperature cycles and annealing cycles should be controlled in such a fashion to minimize residual stresses around the magnetic gap 130.

As illustrated in FIG. 4, a pair of spaced, vertically extending slots are located one on each side adjacent to the "C" magnetic core 84. The vertical slots 80 have been added to the trailing edge 60 of the magnetic head slider body 52 to facilitate the coil winding and to reduce the flux leakage losses and parasitic inductance normally associated with the prior art devices as illustrated in FIG. 1.

FIG. 5 illustrates the relationship between the pair of spaced, load rails 66 having the air bearing surface 104 formed therein and that the wedge-shaped central rail 102 having an air bearing surface 106 is positioned intermediate to the load rails 66 and substantially in alignment and spaced from the load rails 66 As illustrated in FIGS. 3, 4 and 5, the wedge-shaped central rail 102 extends through the entire length of the magnetic head slider 52 and communicates with the wedge-shaped and formed into the lower arm 90 (FIG. 3) of the "C" shaped magnetic core 84 (FIGS. 3 and 5).

Each of the load rails 66 has chamfered edges 100 formed therein which extends between the leading ramp edge 58 and the trailing ramp edge formed in the trailing edge 60 of the slider.

In the preferred embodiment, the microminimonolithic magnetic head slider is formed of manganese-zinc ferrite. This is generally known as a "ceramic-type" material, but is not a true "ceramic" which typically has a glassy or amorphous stage. Also, other single crystal or polycrystal ferrite materials can be utilized as the magnetic head slider body. Further, a wide range of alternate chemical compositions of ferrite may be used. The selection of the desired material for the slider body depends upon a number of criteria such as the mechanical properties, e.g. porosity, of the material, the magnetic properties, e.g. permeability, of the material, and the ability of the material to withstand variables in temperature cycles which are experienced during the glass bonding process. Also, if a curable adhesive or epoxy is utilized in lieu of glass bonding, the coefficient of expansion must be considered relative to the ceramic material as described hereinbefore.

Typical of the family of manganese-zinc ferrite which could be utilized in practicing this invention are the following.

(1) HR5-2; HR5-4 and HR5-5 manganese-zinc ferrite offered for sale and sold by TDK; or (2) A manganese-zinc ferrite known as C×C-H3F8 offered for sale and sold by Sumitomo Corporation; and (3) Manganese-zinc ferrites generally referred to as type 71 [HPF-71MS] manganese-zinc ferrite; type 73 [HPF-73M] manganese-zinc ferrite; and type 75 [HPF-75M] manganese-zinc ferrite offered for sale and sold by KME Corporation. In addition, a nickel zinc ferrite may be used in lieu of the manganese-zinc ferrite for practicing this invention.

In the preferred embodiment of the present invention, the height of the magnetic slider, that is the height of the leading edge 50 of the magnetic slider body 52, is approximately 0.034 inches (0.86 mm). The width of the air bearing surface 104, on each of the load rails 66 is approximately 0.022 inches (0.56 mm). The width of the air bearing surface 106 on the central rail 102 is approximately 0.00075 inches (19 microns), which exceeds the width of the tracks of recorded information on a magnetic media.

The gap length of gap 130 is preferably in the range of about 20 microinches to about 40 microinches (about 0.5 microns to about 1 micron). A range of widths may be used for the air bearing surface 104 and the range may vary from about 0.014 inches to about 0.028 inches (about 0.36 mm to about 0.71 mm). Likewise, the air bearing surface 106 on central rail 102 may vary over a range of widths, and the range may vary from about 0000350 inches to about 0.000900 inches (about 8.9 mm to about 22.8 mm).

FIG. 6 illustrates, in a pictorial representation, that the lower arm 90 of the "C" shaped magnetic core 84 (illustrated in FIG. 10) which has the lower end thereof tapered into the wedge-shaped central rail 102 having the air bearing surface 106. The angle of the apex portion of the wedge-shaped central rail 102 is approximately 60°.

FIG. 7 illustrates pictorially the relationship between the lower arm 90 of the "C" shaped magnetic core 84, illustrated in FIG. 10, and that the total core apex angle, shown by arrows 122 and 128, having a total angle of approximately 90°. The total core apex angle could vary over a range of angles from about 30° to about 120°, with the preferred or optimum apex angle being approximately 90°. The 90 degree total core apex angle is split approximately equally (45 degrees/45 degrees). Approximately 45° of the angle shown by the arrow 122 is formed in the "C" shaped core 90 and the remaining 45°, shown by the arrow 128, is formed in the lower outer edge 72, located in the trailing edge 60 of the magnetic head slider body 52. With this core geometry, the apex flux leakage losses and the head inductance are decreased which results in an increase in core read efficiency and write field strength. This is illustrated in greater detail in FIG. 8.

Referring again to FIG. 7, an acute angle 120 in the preferred embodiment is approximately 10°. However, the acute angle 120 could vary within a range of about 10° to about 20°. The acute angle 120 is formed in the opposed outer edge of the arm 90 of the "0" shaped magnetic core 84 to concentrate the magnetic flux in the magnetic gap 130. In this manner, the lower outer edge 72, which defines the transverse slot 70 in the trailing edge 60 of the magnetic head slider body 52, forms one magnetic pole piece. The other magnetic pole piece is defined by the lower end 90 of the "C" shaped magnetic core 84. A gap 130, having a predetermined length, say a gap in the order of about 25 microinches (0.63 mm), is formed between the pole piece 72 and the pole piece 90 to define a transducing gap. A glass filler bonding material, shown by dashed lines 132, is applied between the "C" shaped core and the transverse slot 70 which bonds the "C" shaped core and slider body as described hereinbefore.

FIG. 8 is intended to illustrate, pictorially, the method of decreasing the core apex flux leakage losses and decrease head inductance, the result of which is to increase the core read efficiency and write field strength. Diagramatically, the lower arm 90 of the "C" shaped magnetic core operates at a greater efficiency if the magnetic flux, shown by lines 134, are concentrated at the ends or tips of the magnetic pole pieces defined by elements 72 and 90. The magnetic pole piece defines a magnetic gap which performs a transducing function with a magnetic media being moved past the gap. The core apex flux leakage, shown generally by arrows 136 is decreased due to the increased reluctance of the air gap formed between the elements 72 and 90. The increased reluctance results in an increase in core efficiency due to the fact that more of the magnetic flux is concentrated at the transducing gap 130 with the above core geometry, such that the amount of flux leakage loss is reduced, as well as the parasitic inductance.

FIG. 9 illustrates one method and structure for bonding the upper end 88 of the "C" shaped core member 84 to the upper, outer edge 74 which defines the transverse slot 70 formed in the trailing edge 60 of the magnetic head slider 52. Edge 142 of the upper edge 74 of slider 52 and the edge defined by the upper arm 88 of core 84 are operatively coupled together by a glass bonding material. The glass bonding material is bonded, using standard glass bonding techniques, to fill the thin gap 140 or space formed between the two contiguous elements, to define a magnetic closure section that passes the magnetic flux between the "C" shaped magnetic core 84 and the magnetic head slider body 52. It is envisioned that other methods for bonding can be used for practicing this invention, such as for example, vacuum sputtering or vacuum deposition, both of which are well known to a person skilled in the art.

FIG. 10 illustrates pictorially a method for winding a coil 96 on the "C" shaped core 84 and through cavity 92. In the preferred embodiment, the coil 96 has about 19 bifilar windings. Thus, the transverse slot 70 performs a dual function; that is: (i) to increase the internal core apex angle, as described in connection with FIG. 7 above, and (ii) to provide clearance means for winding the coils around the central portion 86 of the "C" shaped magnetic core member 84.

FIG. 11 illustrates a magnetic head slider flexure arm shown generally as 200, having a support end 204 and a head/slider loading end 206. A magnetic head slider assembly, shown generally as 210, is operatively attached by the top outer surface 214 thereof, which is an opposed, spaced, parallel surface to the aerodynamic surface described herein, to the head/slider loading end 206 by attaching means which are well known in the art. The "C" shaped magnetic core has the leads of the coil windings, shown generally as 216, electrically connected to leads 218 which pass from the head slider loading end 206, through a tubular member to the support end 204 of the head/slider flexure.

By utilizing the teachings of the present invention, the magnetic head slider, as a separate component, has an overall height of approximately 0.034 inches (0.86 mm) which allows for a lower profile. A lower profile, that is the dimension in the "z-height" direction associated with a rotating magnetic disk, is highly desirable when the magnetic head slider assembly is attached to and used with a magnetic head slider flexure. Also, the magnetic head slider assembly using the teachings of this invention has a smaller physical size, lower mass, and a more efficient core geometry. Also, the "C" shaped magnetic core can be easily bonded to the magnetic head slider by using the teachings of this invention.

By forming a transverse slot in the trailing edge of the magnetic head slider, as described herein, the angles of the elements defining the pole piece can be controlled.

Specifically, the internal core apex angle can be increased to approximately 90° total. Preferably, the 90° angle is split approximately equally, between the lower end of the "C" shaped magnetic core and the lower outer edge which defines the transverse slot. By increasing the internal core apex angle, a decrease in core apex flux leakage is obtained, which directly reduces the core apex flux leakage losses and decreases the head inductance. As a result of the above geometry, an increase in core read efficiency and write field strength is obtained.

The addition of horizontal slots to the back of the slider trailing edge physically interposes a larger air gap between the trailing edge of the magnetic head slider, on one hand, and on the other hand, the lower leg of the "C" shaped magnetic core. As a result, the core efficiency is increased and a portion of the actual core opening or cavity is moved into the slider body, which facilitates easier coil winding as described herein.

With the addition of two spaced vertical slots formed into the trailing edge of the magnetic head slider, one on each side of and adjacent to the "C" shaped magnetic core, the removal of magnetic material of the slider located in the vicinity of the "C" shaped magnetic core to form the vertical slots, further reduces flux leakage losses and parasitic inductance, between the magnetic core and the slider. Also, the vertical slots facilitate coil winding due to the addition of space or a larger cavity which is present within the area of the magnetic core itself.

It is well known in the rotating magnetic memory storage system art that the industry is advancing to have a tighter packing density and to reduce the disk-to-disk spacing. As a result, magnetic head slider flexures must have a lower profile and the reduction in height of the magnetic head flexure, when coupled with reduction in height of the improved magnetic head slider assembly of the present invention, permits use of low profile magnetic head slider assemblies resulting in improved rotating disk memory systems. Typically, the "z-height", that is the distance of the known prior art magnetic head slider assemblies, are in the order of 0.050 inches (1.27 mm). By reducing the overall height of the magnetic head slider of the present invention to approximately 0.034 inches (0.86 mm), approximately 0.032 inches (0.81 mm) decrease in disk to-disk spacing can be obtained Thus, the use of the magnetic head slider assembly having a low profile as that of the present invention can be used with improved magnetic head flexures also having a low profile As a result, the magnetic head slider the magnetic head slider assembly fabricated from the same, and the combination of a magnetic head slider flexure, having a lower profile, together with the improved magnetic head slider assembly results in an improved, lower profile subassembly which can be used to provide the additional spacing advantage required for accommodating the smaller distances in the improved state-of-the-art rotating disk memory systems.

What is claimed is:

1. A microminimonolithic slider adapter for use with a magnetic head flying on an air cushion over a moving magnetic media for recording and reproducing tracks of information, said slider comprising
    means for defining an aerodynamic surface having a pair of spaced, parallel load rails which are adapted to fly over the moving magnetic media, said aerodynamic defining means further including means for defining an air bearing surface formed on each of said load rails having a width in a direction substantially normal to and which is greater than the track width of information on a magnetic media;
    means for defining an the aerodynamic surface, and between said pair of spaced, parallel load rails, a central rail having an apex which defines an air bearing surface having a width in a direction substantially normal to the track of information on a magnetic media and which is less than the width of the air bearing surface on each of said load rails;
    means for defining a trailing edge located rearward of said aerodynamic surface and for defining through the trailing edge a transverse slot which is spaced from and extends substantially perpendicular to said pair of spaced, parallel load rails and said central rail, said transverse slot including means for defining a magnetic pole piece contiguous the central rail and the air bearing surface formed on the apex thereof; and
    means for defining in the trailing edge of said slider and through the transverse slot a pair of spaced, parallel, vertically extending slots which are substantially normal to said transverse slot, said vertically extending slots being positioned with said central rail located therebetween.

2. The microminimonolithic slider of claim 1 wherein each of said load rails is located on an edge of said slider.

3. The microminimonolithic slider of claim 1 wherein each side of said load rails has chamfered edges.

4. The microminimonolithic slider of claim 1 wherein said slider is formed of manganese-zinc ferrite.

5. A microminimonolithic magnetic head slider adapted for use with a magnetic head flying on an air cushion over a moving magnetic media for recording and reproducing tracks of information, said slider having an aerodynamic surface that is adapted to be positioned adjacent the moving magnetic media during operation wherein the slider includes a leading edge located forward of the aerodynamic surface and adapted to interact with a magnetic media moving in a direction towards said slider and a trailing edge located rearward of the aerodynamic surface, said slider comprising
    means or defining on the aerodynamic surface a pair of spaced, parallel load rails which are adapted to fly over the moving magnetic media, said load rails defining means including means for defining an air bearing surface formed on each of said load rails having a width in a direction substantially normal to and which is greater than the track width of information on a magnetic media and wherein each of said load rails terminates at one end thereof in a leading edge ramp and at the other end thereof in a trailing edge ramp;
    means for defining on the aerodynamic surface, and between said pair of spaced, parallel load rails, a wedged-shaped central rail having an apex which defines an air bearing surface having a width in a direction substantially normal to the track of information on a magnetic media which is less than the width of the air bearing surface on each of said load rails;
    means for defining through the trailing edge of said slider, and through the trailing edge ramp a transverse slot which is spaced from and extends substantially perpendicular to said pair of spaced, parallel load rails and said central rail, said transverse slot including means for defining a magnetic pole piece contiguous the wedge-shaped central rail and the air bearing surface formed on the apex thereof; and means for defining in the trailing edge of said slider and through the transverse slot a pair of spaced, parallel, vertically extending slots which are substantially normal to said transverse slot, said vertically extending slots being positioned with said central rail located therebetween.

6. The microminimonolithic magnetic head slider of claim 5 wherein each of said load rails is located on an edge of said slider and extend in a direction substantially tangent to the rack of information on a rotating magnetic media.

7. The microminimonolithic magnetic head slider of claim 6 wherein each edge of said load rails has chambered edges which extend between the leading edge ramp and trailing edge ramp.

8. The microminimonolithic magnetic head slider of claim 5 wherein said slider is formed of a manganese-zinc ferrite.

9. The microminimonolithic magnetic head slider of claim 5 wherein the height of the magnetic slider extending in a direction substantially normal to the air bearing surface located on said load rails is approximately 0.034 inches.

10. The microminimonolithic magnetic head slider of claim 5 wherein the width in a direction substantially normal to the track of information on the magnetic media of the air bearing surface on each load rail is selected to have width in the range of about 0.014 inches to about 0.028 inches.

11. The microminimonolithic magnetic head slider of claim 10 wherein the width in a direction substantially normal to the track of information on the magnetic media of the air bearing surface on each of the load rails is selected to be approximately 0.022 inches.

12. The microminimonolithic magnetic head slider of claim 5 wherein the width of the air bearing surface of the central rail is selected to have a width in a direction substantially normal to the track if information on the magnetic media in the range of about 0.00035 inches to about 0.00090 inches.

13. The microminimonolithic magnetic head slider of claim 12 wherein the width in a direction substantially normal to the track of information on the magnetic media of the air bearing surface of the central rail is selected to be approximately 0.00075 inches.

14. The microminimonolithic magnetic head slider of claim 5 wherein the gap length in a direction substantially parallel to the track of information on a magnetic media is selected of length in the range of about 20 microinches to about 40 microinches.

15. The microminimonolithic magnetic head slider of claim 14 wherein the gap length in a direction substantially parallel to the track of information on a magnetic media is selected to be approximately 25 microinches.

16. The microminimonolithic magnetic head slider of claim 5 wherein the magnetic pole piece defined in the transverse slot is formed to be at an angle of approximately 45° to the air bearing surface of the central rail.

17. The microminimonolithic magnetic head slider of claim 16 further comprising a "C" shaped core of magnetic material having an upper end and a lower end having an opposed outer edge with the upper end thereof formed into a planar magnetic closure portion and with the lower end thereof formed into a magnetic pole piece, said "C" shaped core being positioned with the upper end thereof contiguous the upper outer edge defining the transverse slot to form a closed magnetic path therebetween and with the lower end thereof spaced a predetermined distance from the magnetic pole piece formed in the lower outer edge of the transverse slot defined in the trailing edge forming a magnetic gap between the magnetic pole pieces.

18. The microminimonolithic magnetic head slider of claim 17 wherein the magnetic pole formed on the lower end of the "C" shaped core, which is adapted to be positioned adjacent to the moving media, has an acute angle located in the opposed outer edge of the lower end and extending in a direction away from said slider formed therein.

19. The microminimonolithic magnetic head slider of claim 17 wherein the gap has a high saturation flux density metal located in the gap.

20. The microminimonolithic magnetic head slider of claim wherein the high saturation flux density metal is alphasil.

21. The microminimonolithic magnetic head slider of claim wherein the high saturation flux density metal is sendust.

22. The microminimonolithic magnetic head slider of claim 7 wherein the angle of the chamfered edge is approximately 45°.

23. A microminimonolithic magnetic head slider that is adapted to be positioned adjacent a moving magnetic media during operation, said slider comprising means for defining an aerodynamic surface having a pair of spaced, parallel load rails each having an air bearing surface formed on each of said load rails of a predetermined width in a direction substantially normal to the moving magnetic media and which are adapted to fly over a moving magnetic media, said aerodynamic surface defining means including means for defining a leading edge and a trailing edge;

means for defining on the aerodynamic surface and between said pair of spaced, parallel load rails a wedged-shaped central rail having an air bearing surface formed on the central rail at the apex of the central rail; in a direction substantially normal to the moving magnetic media means for defining through the trailing edge of said slider and spaced from said aerodynamic surface, a transverse slot which extends substantially perpendicular to said pair of spaced, parallel load rails and said central rail and a pair of spaced, parallel vertically extending slots which extend substantially perpendicular to said transverse slot, said transverse slot defining means, including means for defining a magnetic pole piece contiguous the wedge-shaped central rail and the air bearing surface formed on the apex thereof; and means for defining in the trailing edge of said slider and through the transverse slot a pair of spaced, parallel, vertically extending slots which are substantially normal to said transverse slot, said vertically extending slots being positioned with said central rail located therebetween.

24. A microminimonolithic magnetic head slider assembly that is adapted to be positioned adjacent to a moving magnetic media during operation, said slider assembly comprising means for defining an aerodynamic surface having a pair of spaced, parallel load rails each having an air bearing surface formed on each of said load rails of a predetermined width in a direction substantially normal to the moving magnetic media and which are adapted to fly over a moving magnetic media, said aerodynamic surface defining means including means for defining a leading edge and a trailing edge;

means for defining on the aerodynamic surface and between said pair of spaced, parallel load rails on a wedge-shaped central rail having an air bearing surface formed on the central rail at the apex of the central rail;

means for defining through the trailing edge of said slider and spaced from said aerodynamic surface, a transverse slot defined by an upper outer edge and a lower outer edge and wherein said transverse slot defining means including means for defining in the lower outer edge a magnetic pole piece contiguous the wedged-shaped central rail and the air bearing surface formed on the apex thereof;

a "C" shaped core of magnetic material having an upper end and a lower end having an opposed outer edge with the upper and thereof formed into a planar magnetic closure portion and with the lower end thereof formed into a magnetic pole piece having at an acute angle located in the opposed outer edge of the lower end and extending in a direction away from said slider, said "C" shaped core being positioned with the upper end thereof contiguous the upper outer edge defining the transverse slot to form a closed magnetic path therebetween and with the lower end thereof spaced a predetermined distance from the magnetic pole piece formed in the lower outer end of the transverse slot defined in the trailing ramp edge forming a magnetic gap between the magnetic pole pieces; and means for defining in the trailing edge of said slider and through the transverse slot a pair of spaced, parallel, vertically extending slots which are substantially normal to said transverse slot, said vertically extending slots being positioned with said central rail located therebetween.

25. The microminimonolithic magnetic head slider of claim 24 wherein the means for defining said transverse slot includes means for defining the magnetic pole piece of the transverse slot at a selected angle from the air bearing surface of the central rail towards the slider wherein said selected angle is a portion of a total apex angle defined between the two magnetic pole pieces.

26. The microminimonolithic magnetic head slider of claim 25 wherein the lower end of the "C" shaped core includes means for defining the magnetic pole piece at an angle formed in an edge opposite the opposed outer edge and towards the slider which is the difference between the selected angle and the total apex angle.

27. The microminimonolithic magnetic head slider of claim 26 wherein the total apex angle is selected to be an angle selected from a range of about 30° to about 120°.

28. The microminimonolithic magnetic head slider of claim 27 wherein the total apex angle is selected to be approximately 90°.

29. The microminimonolithic magnetic head slider assembly of claim 24 wherein each of said load rails is located on an edge of said slider and extend in a direction substantially tangent to the track of information on a rotating magnetic media.

30. The microminimonolithic magnetic head slider assembly of claim 24 wherein each of said load rails has chamfered edges which extend between the leading ramp edge and trailing ramp edge.

31. The microminimonolithic magnetic head slider assembly claim 29 wherein said slider is formed of a manganese-zinc ferrite.

32. The microminimonolithic magnetic head slider assembly of claim 29 wherein the height of the magnetic slider extending in a direction substantially normal to the air bearing surface located on said load rails is approximately 0.034 inches.

33. The microminimonolithic magnetic head slider assembly of claim 29 wherein the width in a direction substantially normal to the track of information on the magnetic media of the air bearing surface of the central rail is approximately 0.022 inches.

34. The microminimonolithic magnetic head slider assembly of claim 29 wherein the width in a direction substantially normal to the track of information on the magnetic media of the air bearing surface of the central rail is approximately 0.00075 inches.

35. The microminimonolithic magnetic head slider assembly of claim 29 wherein the magnetic pole piece of the transverse slot is formed to be at angle of approximately 45° to the air bearing surface of the central rail.

36. The microminimonolithic magnetic head slider assembly of claim 29, wherein the angle of the chambered edge is approximately 45°.

37. The microminimonolithic head slider assembly of claim wherein a coil is wound around the "C" shaped core.

38. In combination,
a flexure arm having a support end and a head slider loading end;
a microminimonolithic head slider assembly operatively attached to said head slider loading end of said flexure arm, said microminimonolithic head slider assembly comprising
means for defining an aerodynamic surface having a pair of spaced, parallel load rails each having an air bearing surface formed on each of said load rails to a predetermined width in a direction substantially normal to the track of information on the magnetic media and which are adapted to fly over a moving magnetic media, said aerodynamic surface defining means including means for defining a leading edge and a trailing edge;
means for defining on the aerodynamic surface and between said pair of spaced, parallel load rails a wedged-shaped central rail having an air bearing surface formed on the central rail at the apex of the central rail having a width in a direction substantially normal to the moving magnetic media which is less than the predetermined width;
means for defining through the trailing edge of said slider and spaced from said aerodynamic surface, a transverse slot which extends substantially perpendicular to said pair of spaced, parallel load rails and said central rail, said transverse slot defining means, including means for defining a magnetic pole piece contiguous the wedged-shaped central rail and the air bearing surface formed on the apex thereof; and means for defining in the trailing edge of said slider and through the transverse slot a pair of spaced, parallel, vertically extending slots which are substantially normal to said transverse slot, said vertically extending slots being positioned with said central rail located therebetween.

39. The combination of claim 38 further comprising a "C" shaped magnetic core of magnetic material having one end thereof formed into a planar magnetic closure portion and with the end thereof formed into a magnetic pole piece, said "C" shaped core being positioned with the one end thereof contiguous that portion of the transverse slot removed from the magnetic pole piece to form a closed magnetic path therebetween and with the other end thereof spaced a predetermined distance from the magnetic pole piece formed in the transverse slot forming a magnetic gap between the magnetic pole pieces.

40. The combination of claim 39 wherein said means for defining the trailing edge of the slider includes means for defining a pair of spaced, parallel, vertically extending slots which extend substantially perpendicular to said transducing slot and positioned one on each side of the central rail.

41. The combination of claim 38 wherein said microminimonolithic head slider is formed of a manganese-zinc ferrite.

42. The combination of claim 39 wherein a coil is wound around said "C" shaped core of magnetic material.

43. The combination of claim 42 wherein the coil has about 19 bifilar windings.

* * * * *